May 17, 1932.  O. R. BRINEY  1,858,235
CHUCKLESS AND CENTERLESS MACHINING DEVICE
Filed Aug. 18, 1927   2 Sheets-Sheet 1
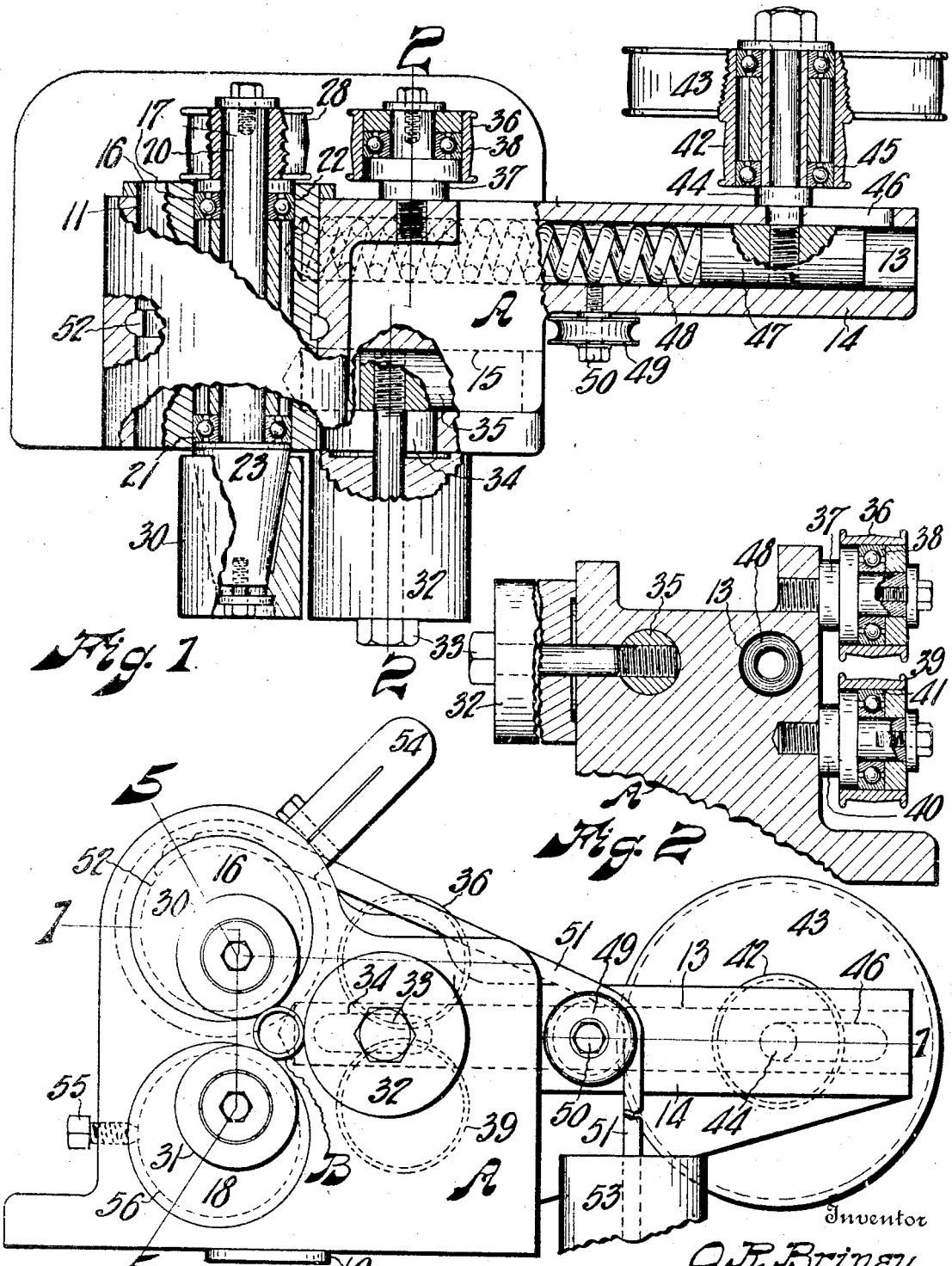
Inventor
O.R.Briney
By
C.F.Heinkel
Attorney

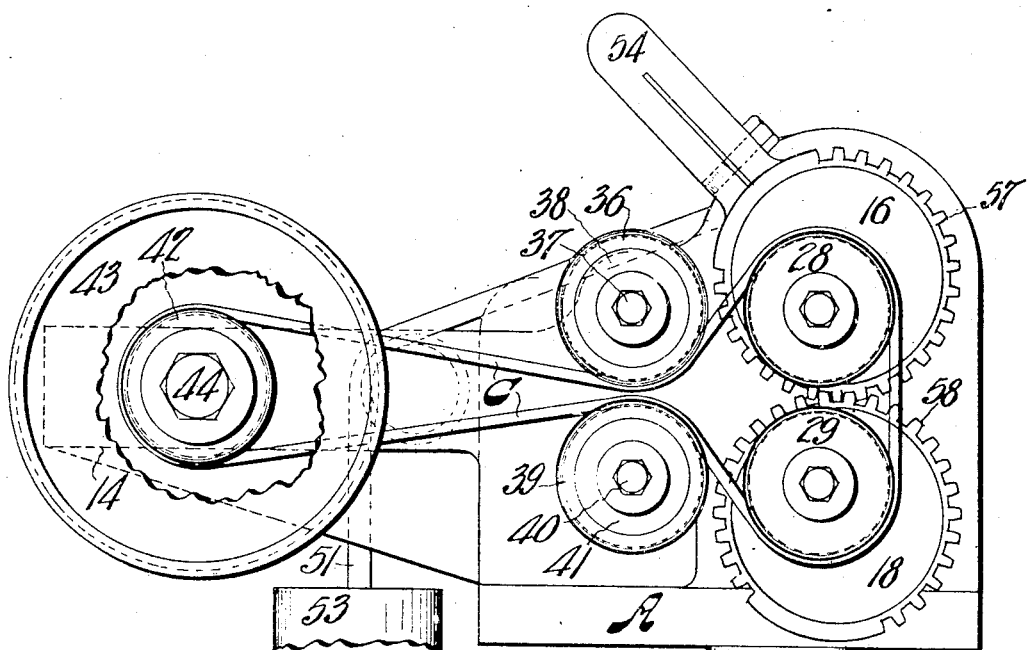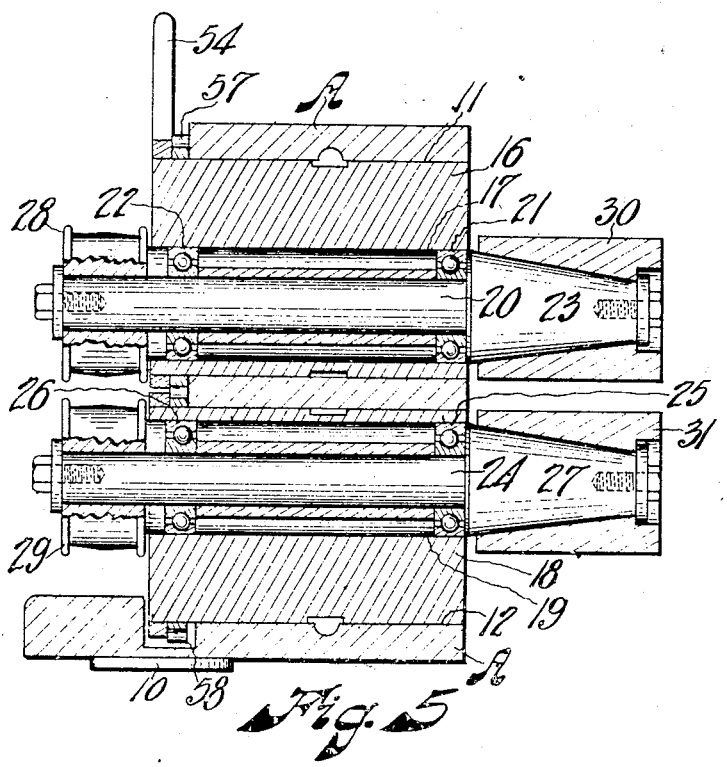

Patented May 17, 1932

1,858,235

UNITED STATES PATENT OFFICE

OTTIS R. BRINEY, OF PONTIAC, MICHIGAN

CHUCKLESS AND CENTERLESS MACHINING DEVICE

Application filed August 18, 1927. Serial No. 213,809.

My invention relates to machining devices generally and more particularly to devices for machining articles or work while the same is being rotated.

The main object of my invention is a simple and inexpensive device for conveniently and economically machining articles or work without centers and without chucks or other similar devices. Other objects will appear, or become apparent or obvious, or will suggest themselves during the description of the device shown in the accompanying drawings in which:—

Fig. 1 is a plan view of a device embodying the features of my invention, partly broken away substantially to the line 1—1 indicated in Fig. 1, and shows the horizontal relations of the elements.

Fig. 2 is a section taken in a vertical plane indicated by the line 2—2 in Fig. 1 and shows the interior relations of the elements of the idler and the abutment mechanisms.

Fig. 3 is a front view of Fig. 1 and shows the vertical relations of the elements.

Fig. 4 is a rear end view of Fig. 1 and shows the vertical relations of the pulleys and idlers and gears.

Fig. 5 is a section taken in a vertical plane indicated by the line 5—5 in Fig. 3 and shows the relations between the stubs and the spindles and the work.

Similar reference characters refer to similar parts throughout the views.

Referring now particularly to the device shown in the accompanying drawings.

The head A has the projection 10 to locate the head on a machine or on any other suitable base; this projection is here shown round so that the head and the mechanism mounted thereon or therein can be swiveled so that taper or spherical work can be machined therewith.

The head A also has the two bores 11 and 12 suitably spaced from each other and also has the bore or channel 13 in the arm 14 and the bore or channel 15 in the body portion. The bores or channels 13 and 15 are both round and are positioned at right angles to the bores 11 and 12 in the present instance. Other forms of bores and other angular relations between the bores may be and can be used.

The stub 16 is journaled in the bore 11 and has the bore 17 the longitudinal axis of which is parallel as well as eccentric with the longitudinal axis of the stub 16.

The stub 18 is journaled in the bore 12 and has the bore 19 the longitudinal axis of which is parallel as well as eccentric with the longitudinal axis of the stub 18.

Angular relations between the axes of the stubs and the bores therein can be used when so desired.

The spindle 20 is journaled in the bore 17 by means of the ball bearings 21 and 22 and has the conical head 23. The spindle 24 is journaled in the bore 19 by means of the ball bearings 25 and 26 and has the head 27. Bearings other than the ball bearings shown can be used when so desired. The pulley 28 is secured to the spindle 20 and the pulley 29 is secured to the spindle 24.

For the purpose of economy in structure, the stubs as well as the spindles and pulleys and bearings (including the bearings to be mentioned presently) and the work contact members are duplicates of each other.

The cylindrical plug or work contact member 30 is mounted on the conical head 23 and the cylindrical plug or work contact member 31 is mounted on the conical head 27. Both of the plugs are duplicates of each other and rotate with the corresponding spindles. The taper of the conical heads is greater than the sticking angle of tapers to permit the plugs to be easily and conveniently removed from and attached to the spindles when desired for such purposes as trueing up the plugs or substituting variously sized plugs.

The cylindrical plug or abutment member 32 is held against the head A by means of the screw 33 which extends through the plug and through the slot 34 in the head and is threaded into the plug or carriage 35 which is slidable longitudinally in the channel 15. Due to the fact that the carriage 35 can slide or move longitudinally in the channel 15 and that the screw 33 can slide in the slot 34, the plug 32 can be moved toward and away from the work B to permit of adjustment of the plug for variously sized work or to bring the work into desirable relations with the plugs 30 and 31. When the plug 32 is moved into a desired position, the screw 33 is tightened whereby the plug 35 is clamped against the wall of the channel 15 and the plug 32 is clamped against the head A to prevent the rotation as well as other movement thereof. When a portion of the circumferential surface of the plug 32 becomes worn, or when a new portion of this circumferential surface is to be brought into work engaging position for any reason, the screw 33 is loosened temporarily whereupon the plug 32 can be rotated on the screw to move a desirable portion of this circumferential surface into work engaging position; upon tightening of the screw 33, the plug 32 will be fixed in position rotatively as well as bodily to form a fixed abutment for the work B.

The idler 36 is journaled on the stud 37 by means of the ball bearing 38 and the idler 39 is journaled on the stud 40 by means of the ball bearing 41.

The pulley 42 and the drive pulley 43 are journaled on the stud 44 by means of the ball bearings 45. The stud 44 extends longitudinally through the pulleys 42 and 43 and through the slot 46 in the arm 14 and is fixedly threaded into the plug or carriage 47 which is slidable longitudinally in the channel 13. The compression spring 48 is placed into the channel 13 and extends between the inner end of the plug 47 and the inner end or bottom of the channel 13. The spring normally tends to move the carriage 47 and the pulleys 42 and 43 outwardly for purposes which will appear presently.

The sheave 49 is journaled on the screw 50 which is threaded into the head A.

One end of the cable 51 is secured to the stub 16 in the groove 52 therein and extends over the sheave 49 and has the weight 53 on the other end thereof for purposes appearing presently.

The handle 54 is clamped onto the end of the stub 16 so that the stub 16 can easily be rotated to rotate the spindle 24 around the longitudinal axis of the stub 16 and thereby either release or contact the work B. The weight 53 normally tends to rotate the stub 16 so that the plug 30 contacts the work B.

The set screw 55 is threaded into the head and abuts the bottom of the groove 56 in the stub 18 to lock the same in position when so desired.

When it is desired to rotate both of the stubs in unison, the gears 57 and 58, preferably in loose mesh with each other, are secured to the corresponding ones of the stubs.

The belt C passes over the pulley 42 and over the pulleys 28 and 29 and contacts the idlers 36 and 39 as seen in Fig. 4.

When the handle 54 is moved, either the stub 16 (no gears) or the stubs 16 and 18 (with gears) are rotated in their journal in the head. Due to the eccentricity of the spindles in the stubs, this rotation of the stubs varies the distance relations between the plugs 30 and 31 and thereby permits the device to take care of variously sized work as well as forming a very quickly and conveniently operated means for releasing work from the device and inserting the same therein.

When the stubs are rotated, resulting in different spacing between the spindles and consequently between the pulleys 28 and 29, the spring 48 permits the plug 47 and the pulley 42 thereon to move inwardly when the plugs 30 and 31 are moved away from each other and moves the plug 47 and the pulley 42 outwardly when the plugs 30 and 31 are moved toward each other and thereby maintains a practically even and uniform tension on the belt in any position of the spindles.

The weight 53 normally tends to rotate the stub 16 to retain the plugs 30 and 31 in working contact with the work B which, in the present instance, is a tubular article the inner surface 59 of which is to be machined.

When the belt is moved by means of the pulley 42, the spindles 20 and 24 and the plugs 30 and 31 thereon are rotated in the same direction and the work is thereby rotated in the opposite direction since the plugs 30 and 31 contact the same and tend to move the same against the fixed abutment plug 32; therefore, in operation, the plugs 30 and 31 rotate the work against the fixed abutment 32 when the belt is moving.

In prior machining devices of the character described, some sort of chucking or arbor or centering device is required to machine articles; these devices are rarely true and do not stay true during use even if they are true when first made, resulting in inaccurate work and constant expense to keep them true as well as the first cost of them.

The present invention eliminates all chucks and other mechanisms of a similar import and provides a means directly on the machining device to produce accurate work most economically and conveniently.

I am aware that changes can be made in the structure as well as in the arrangement shown and described within the scope of the appended claims, therefore, without limiting myself to the precise structure and arrangement of the elements as shown and described.

I claim:—

1. A device of the character described including a rotatable stub and a spindle eccentrically journaled therein and having work contact means and a cable having one end thereof secured to peripheral surface of said stub and contacting a portion of said surface, and a weight on the other end of said cable to rotate said stub and thereby move said spindle eccentrically to abut said contact means on said work.

2. A device of the character described including a head and pulleys and idlers and a belt for the same and a belt tightening means including a plug movable in a channel in said head and having a stud carrying one of said pulleys, and a spring in said channel and abutting said plug to move the same and said pulley thereon to tighten said belt.

3. A device of the character described including a plurality of pulleys, some of said pulleys operating individual journal forming members of the device, another one of said pulleys being a drive pulley for all of said pulleys and movable positionally in relation to the other pulleys, a belt over all of said pulleys, and yieldable means adapted to move said drive pulley to keep said belt tight on all of said pulleys.

4. A machining device including article contacting members each eccentrically journaled within the journal of a journaled part of the device for positional movement thereof, a positionally fixed article contacting member normally in co-operative relation to definitely position an article in the device, means to rotate at least one of the journaled parts to vary the co-operative relation between said article contacting members to release and to confine the article, and means to rotate at least one of said article contacting members to rotate the article.

5. A machining device including article contacting members each eccentrically journaled within the journal of a journaled part of the device for positional movement thereof and a positionally fixed article contacting member normally in co-operative relation to definitely position an article in the device, means to rotate at least one of the journaled parts to vary the co-operative relation between said members to release the article, means to adjust the co-operative relation between said members to adapt the device for differently sized articles, and means to rotate at least one of said article contacting members to rotate the article.

6. A machining device including article contacting members each eccentrically journaled within the journal of a journaled part of the device and a positionally fixed article contacting member normally in co-operative relation to definitely position an article in the device, means to rotate at least one of the journaled parts to vary the co-operative relation of said members to release the article, and means to rotate less than all of said members to rotate the article.

7. A machining device including article contacting members each eccentrically journaled within the journal of a journaled part of the device and a positionally fixed article contacting member normally in co-operative relation to definitely position an article in the device, means to rotate at least one of the journaled parts to vary the co-operative relation of said members to release the article, means between the parts to rotate the same and to move the article contacting members therein in unison, and means to rotate less than all of said members to rotate the article.

8. A machining device including article contacting members each eccentrically journaled within the journal of a journaled part of the device and a positionally fixed article contacting member normally in co-operative relation to definitely position an article in the device, means to rotate at least one of the journaled parts to vary the co-operative relation of said members to release the article, tension means tending to retain said members in co-operative relation, means to vary the co-operative relation between said members to release the article, and means to rotate less than all of said members to rotate the article.

9. A machining device including article contacting members each eccentrically journaled within the journal of a journaled part of the device and a positionally fixed article contacting member normally in co-operative relation to definitely position an article in the device, means to rotate at least one of said parts to vary the co-operative relation of said members to release the article, means between said parts to rotate the same in unison, tension means tending to retain said members in co-operative relation, and means to rotate less than all of said members to rotate the article.

10. A machining device including article contacting members arranged in a triangular relation to locate an article in a definite position in the device, two of said members eccentrically journaled within the journal of a journaled part of the device to be moved to locate and to release the article upon a rotative movement of said parts, and means to rotate less than all of said members to rotate the article in the device.

11. A machining device including article contacting members arranged in a triangular relation to locate an article in a definite position in the device, two of said members eccentrically journaled within the journal of a journaled part of the device to be moved toward each other and toward the third one of said members to position the article and away from each other and away from the third member to release the article upon a rotative movement of said parts, and means to rotate less than all of said members to rotate the article.

12. A machining device including rotatable positionally movable and positionally fixed article contacting members normally in co-operative relation to definitely position an article in the device, each of said positionally movable members being eccentrically journaled in a journaled part of the device, means to rotate said parts to vary the co-operative relation of said members to release the article, and a drive means to rotate movable members in unison.

13. A machining device including rotatable positionally movable and positionally fixed article contacting members normally in co-operative relation to definitely position an article in the device, each of said positionally movable members being eccentrically journaled in a journaled part of the device, means to rotate said parts to vary the co-operative relation of said members to release the article, pulleys on rotatable members, a bolt over the outside of said pulleys to rotate the rotatable members and tending to retain the same in co-operative relation, and a tension means to retain said belt means in driving contact with said pulleys.

14. A machining device including rotatable laterally spaced stubs, a spindle journaled in each one of said stubs eccentric with the journal of the stub, article contacting members on said spindles and on the device in co-operative relation to definitely position an article in the device and to release the article when the stubs are rotated, and means to rotate said spindles to rotate the contacting members thereon to rotate the article.

15. A machining device including rotatable laterally spaced stubs, a rotatable spindle extending longitudinally through each one of said stubs eccentric with the journal of the stub, an antifriction bearing means between said spindles and the corresponding one of said stubs, article contacting members on said spindles and on the device in co-operative relation to definitely position an article in the device and to release the article when the stubs are rotated and means to rotate said spindles to rotate the contacting members thereon to rotate the article.

16. A machining device including rotatable laterally spaced stubs, a spindle journaled in each one of said stubs eccentric with the journal of the stub, article contacting members on said spindles and on the device in co-operative relation to definitely position an article in the device and to release the article when the stubs are rotated, intermeshing means between said stubs to rotate the same in unison and thereby move said spindles and contacting members thereon uniformly in relation to each other and to a contacting member on the device, and means to rotate said spindles to rotate the contacting members thereon to rotate the article.

17. A machining device including rotatable laterally spaced stubs, a spindle journaled in each one of said stubs eccentric with the journal of the stub, article contacting members on said spindles and on the device in cooperative relation to definitely position an article in the device and to release the article when the stubs are rotated, intermeshing means between said stubs to rotate the same in unison and thereby move said spindles and contacting members thereon uniformly in relation to each other and to a contacting member on the device, a tension means acting on one of said stubs tending to rotate the same and thereby rotate all of the stubs to move the spindles and contacting members thereon into contact with the article, and means to rotate said spindles to rotate the contacting members thereon to rotate the article.

18. A machining device including positionally movable and positionally fixed article contacting members normally in co-operative relation to definitely position an article in the device, each of said positionally movable members being eccentrically journaled in a journaled part of the device, pulleys on positionally movable article contacting members, idlers in alinement with said pulleys, anti-friction means in said idlers, and a belt means over said idlers and pulleys.

19. A machining device including rotatable laterally spaced stubs, a rotatable spindle extending longitudinally through each one of said stubs eccentric with the journal of the stub, an anti-friction bearing means between said spindles and the corresponding one of the stubs, article contacting members on the spindles and on the device in co-operative relation to definitely position an article in the device and to release the article when the stubs are rotated, a pulley on each one of said spindles to rotate the same and the article contacting member thereon to rotate the article, idlers in alinement with said pulleys, antifriction bearing means in said idlers, a belt means over said pulleys and idlers to rotate the same and normally tending to move said pulleys toward each other, and a tension means to retain the belt means in driving contact with said pulleys.

In testimony of the foregoing I affix my signature.

OTTIS R. BRINEY.